Sept. 13, 1949.  J. W. HEWITT, JR  2,482,001
DIE EDGE GRINDING APPARATUS
Filed July 16, 1946   5 Sheets-Sheet 1
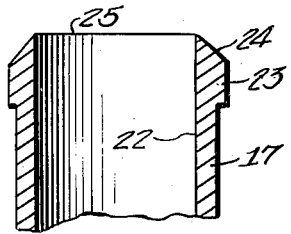
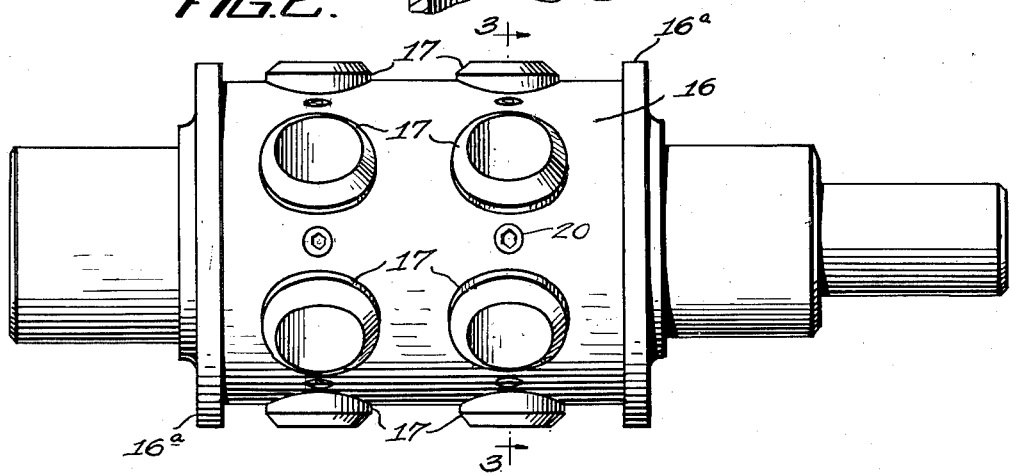
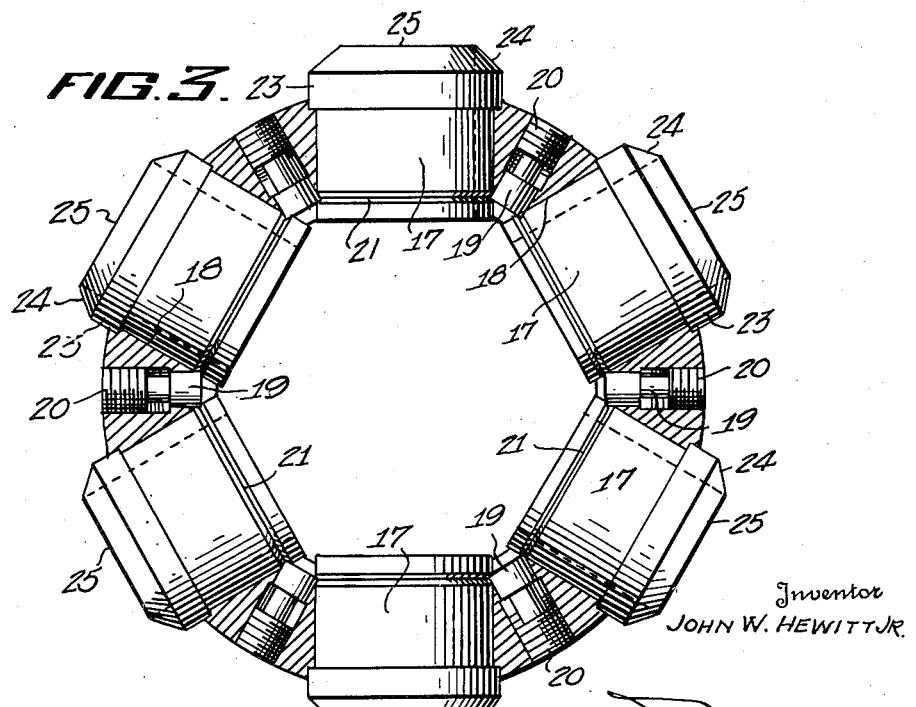
Inventor
JOHN W. HEWITT JR.

Sept. 13, 1949. J. W. HEWITT, JR 2,482,001
DIE EDGE GRINDING APPARATUS
Filed July 16, 1946 5 Sheets-Sheet 2

Inventor
JOHN W. HEWITT JR.

Sept. 13, 1949. J. W. HEWITT, JR 2,482,001
DIE EDGE GRINDING APPARATUS
Filed July 16, 1946 5 Sheets-Sheet 3

Inventor
JOHN W. HEWITT JR
By Lee F. Buusland
Attorneys

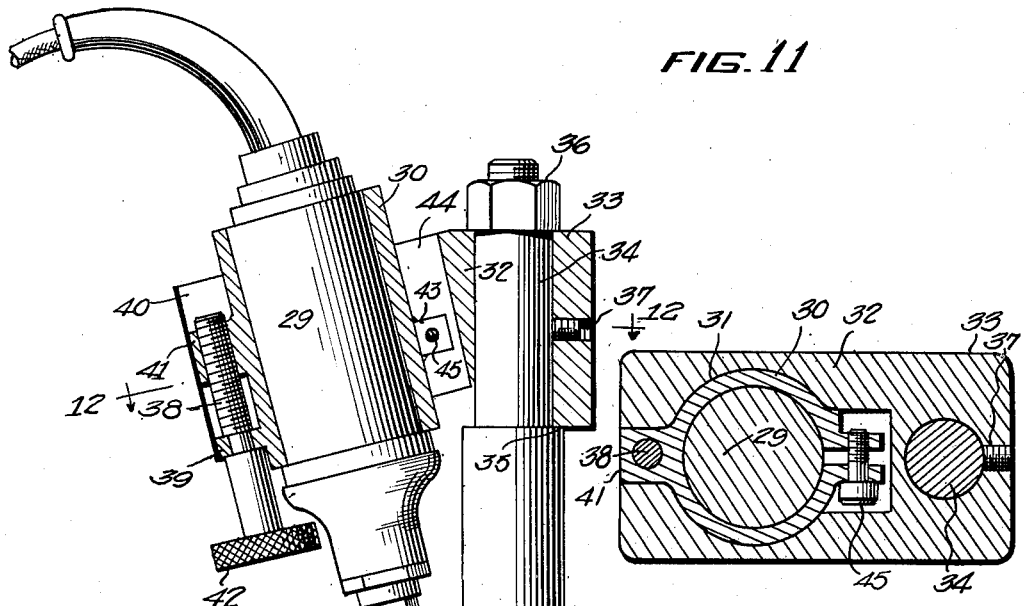
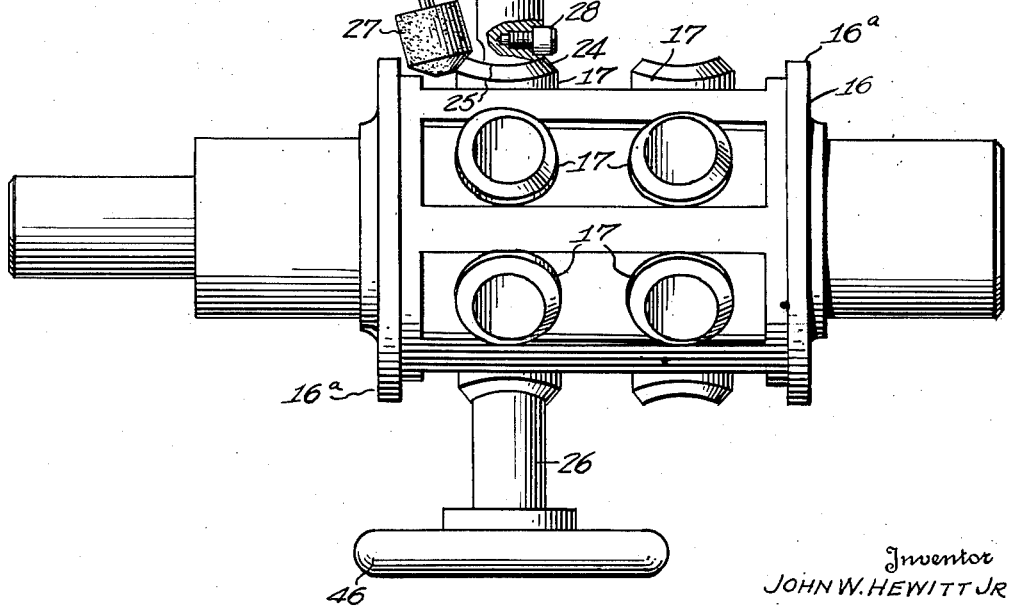

Sept. 13, 1949.  J. W. HEWITT, JR  2,482,001
DIE EDGE GRINDING APPARATUS
Filed July 16, 1946  5 Sheets-Sheet 5
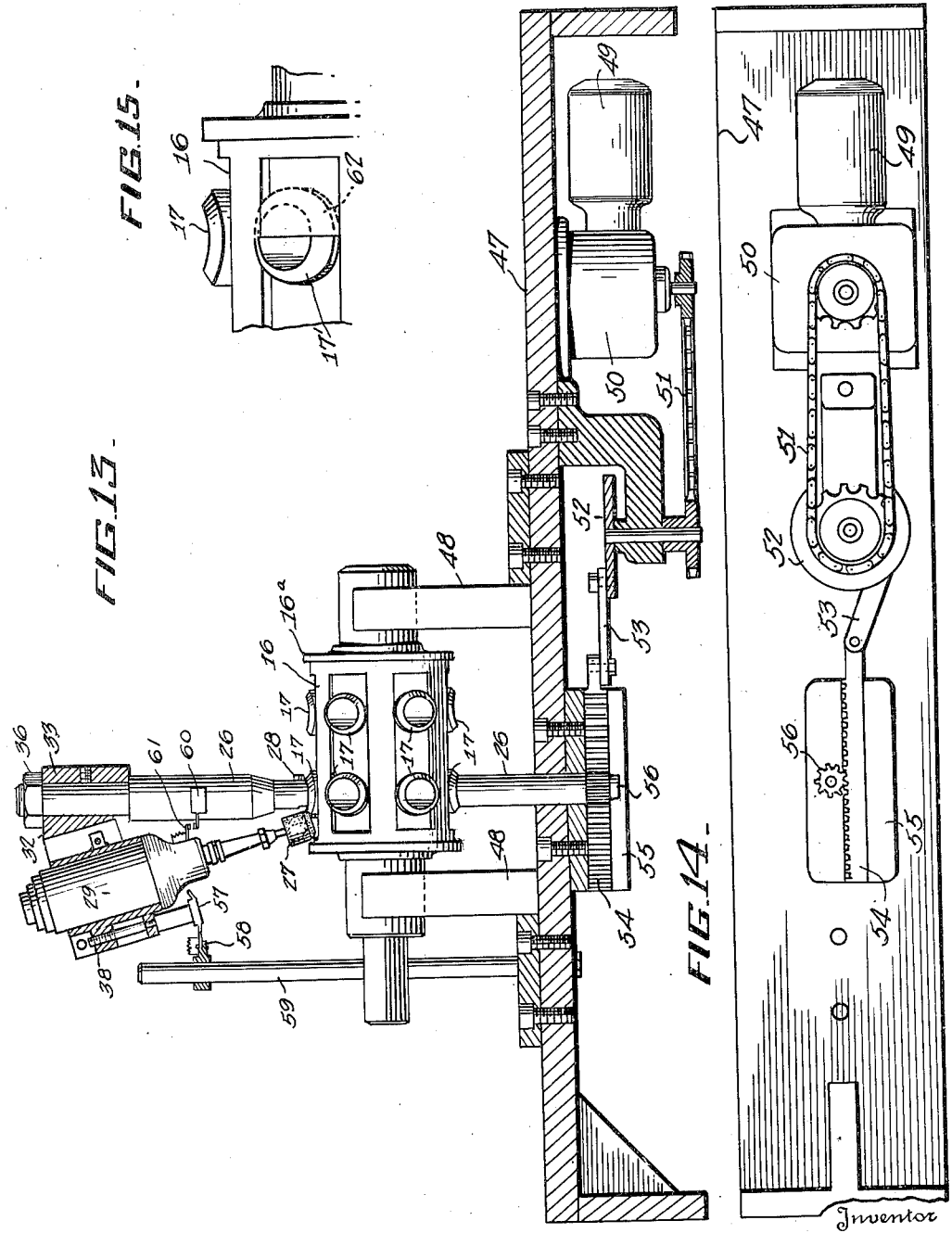
Inventor
JOHN W. HEWITT JR.
By Lee F. Townsend
Attorney Patented Sept. 13, 1949

2,482,001

UNITED STATES PATENT OFFICE 2,482,001

DIE EDGE GRINDING APPARATUS

John W. Hewitt, Jr., Neenah, Wis.

Application July 16, 1946, Serial No. 683,894

6 Claims. (Cl. 51—241)

This invention relates to the making of dies for rotary cutters of the type utilizing a die carrier roll and an anvil roll between which sheet or web material is fed for cutting out a plurality of articles shaped in accordance with the configuration of the dies. Rotary cutters of this character operate at high speeds, and the cutting edge of each die has only a rolling point contact with the work; furthermore, the contact is of extremely short duration. It is essential that the cutting edge of the die be uniform throughout its entirety and that it be highly accurate. The proper machining of the dies, especially circular dies for disc cutting, is difficult and expensive under methods known to the art prior to this invention.

A primary object of this invention is to provide a novel method and apparatus for edge-grinding rotary cutter dies by simple operations not requiring highly skilled labor, to establish a cutting edge that is uniform over its entire extent.

Another object is to provide a method and apparatus for forming cutting lands of uniform taper on die blanks mounted in service position directly in a cutter roll on which they are to be used.

A further object is to provide a novel method of edge-forming a rotary cutter die in a curved plane normal to the axis of the die.

Still another object is to provide an apparatus for uniformly bevel grinding the cutting edge of a die having its cutting edge disposed in a curved plane. Other objects will be apparent to those skilled in the art.

The present disclosure constitutes an embodiment of method and apparatus by which the invention is reduced to practice. It is to be understood that any desired changes in details of the structure and method may be made that are within the scope of the invention as claimed.

In the drawings:

Figure 1 is an axial sectional view of a die blank prior to grinding in accordance with the invention;

Figure 2 is an elevation of a cutter roll with die blanks mounted therein in service position preparatory to grinding;

Figure 3 is a section taken on the line 3—3 of Figure 2;

Figure 11 is an elevation of an assembly in which the edge grinder tool is mounted for manual shifting over the die edge being ground;

Figure 12 is a section taken on the line 12—12 of Figure 11;

Figure 13 is an elevation of an apparatus in which the edge grinder tool is automatically shifted over the die edge being ground and is at the same time automatically fed to the work;

Figure 14 is a bottom plan view of the apparatus shown in Figure 13; and

Figure 15 is a fragmentary elevation of a holder with a die blank therein in which the cutting edge is less than a full circle.

Figure 4:
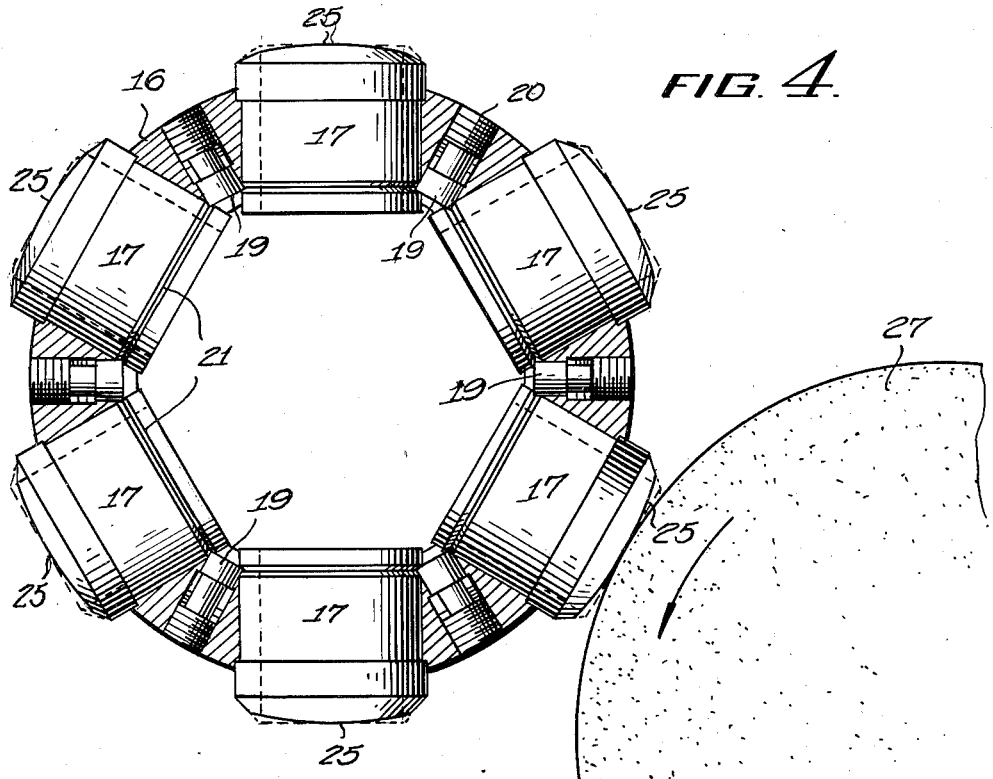
Figure 4 is a section similar to Figure 3 illustrating the manner of circle grinding the die blanks as a step of the method.

As herein disclosed, a hollow die carrier roll 16 is utilized as the support for a plurality of die blanks 17 arranged as diametrically opposed pairs in radial sockets 18 formed through the roll body. Locking screws 19 threaded in radial sockets 20 engage retainer grooves 21 on the inner end portions of the die blanks to secure the blanks firmly in service position in the roll. Each die blank comprises a cylindrical shank having an axial bore 22 and an annular head 23. The head is formed with a bevel 24 to provide a cutting edge or land 25 which occupies in its entirety a plane normal to the axis of the blank. Bearer rings 16a are secured on each end of the roll for contact with an anvil roll (not shown) when the die roll is placed in service. The mounting of the die blanks in the die roll as shown in Figures 2 and 3 constitutes the first step in the method of this invention. At this stage, the cutting edges of the die blanks lie in planes tangential to the circumference of a circle defined by the bearer rings.

Figure 6:
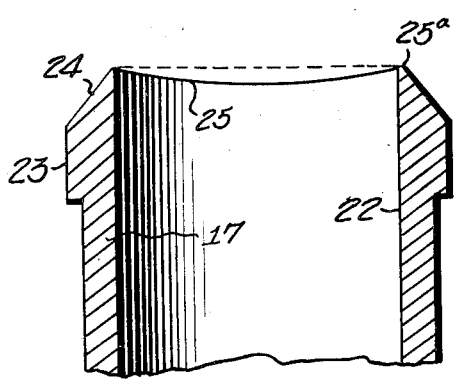
Figure 6 is a section through the die blank of Figure 5 but rotated 90 degrees relative thereto.
Figure 5:
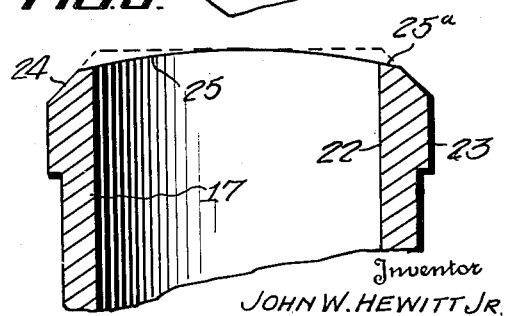
Figure 5 is an axial section through one of the die blanks after it has been circle ground as shown in Figure 4.

In order that the dies may function in service, their cutting edges 25 must lie at all points on the circumference of a circle that is equal in diameter to the external diameter of the bearer rings 16a. This is accomplished in the second step of the method by circle grinding the die edges 25 as shown in Figures 4, 5 and 6. In this operation, the roll 16 is rotated to bring the die edges 25 successively into operative engagement with a grinding surface 27, here shown as an oppositely rotated abrasive wheel, so positioned that the edges 25 will be ground off on arcs which lie in the circumference of a circle of requisite diameter having its axis perpendicular to the axes of the die bores and coaxial with the roll 16. The extent of metal removed at this stage is indicated in dotted lines in Figure 4.

At the conclusion of the circle grinding operation the edges 25 are blunt. As a result of the grinding, a land 25a, see Figures 5 and 6, is formed over the entire extent of each edge. The width of the land varies from a maximum at diametrically opposite points in a plane at right angles to the axis of the roll 16 to a minimum at diametrically opposite points in a plane rotated 90 degrees relative to the first plane. Figure 5 illustrates the maximum width of the land and Figure 6 the minimum. Unless the land is sharpened to provide a cutting edge that is uniform throughout its extent, the die would fail to function properly in service. In this embodiment, the edge is sharpened to .003 of an inch with a tolerance of not more than .0005 of an inch at any point.

Figure 7:
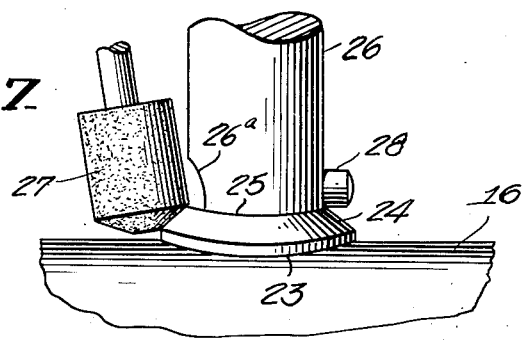
Figure 7 is a fragmentary elevation illustrating a step in the grinding method by which excess die blank metal resulting from the circle grinding is removed by a work-guided grinding tool.
Figures 9, 10:
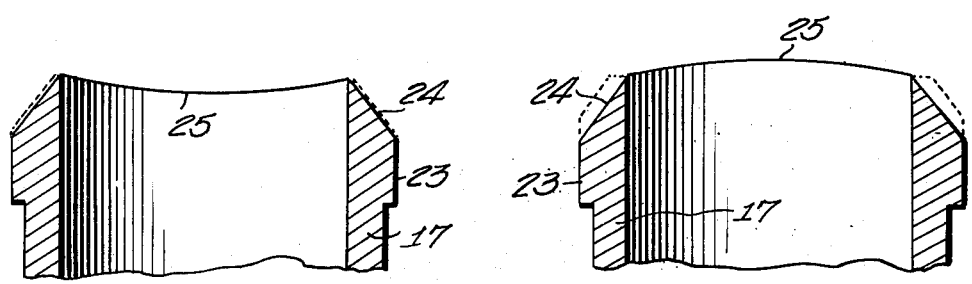
Figure 9 is a fragmentary section through a completed die illustrating by dotted lines the extent of metal removed by the tool in its Figure 7 position.
Figure 10 is a section similar to Figure 9 but rotated 90 degrees relative thereto, illustrating in dotted lines the extent of metal removed by the tool in its Figure 8 position.
Figure 8:
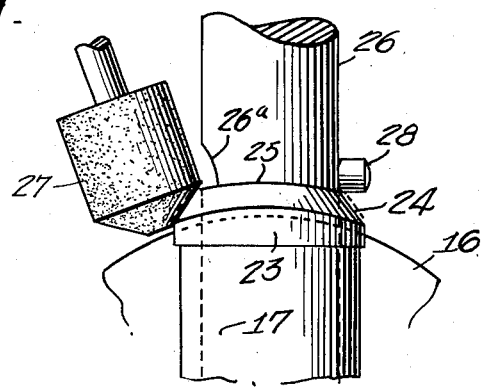
Figure 8 is a fragmentary elevation similar to Figure 7 but with the grinding tool operating at a point rotated 90 degrees relative to its Figure 7 position.

Requisite sharpening of the blunt land is effected in the third step of the method, by a bevel grinding operation as shown in Figures 7 and 8. A tool post 26 is positioned in the bore of the die for free rotation and free axial movement therein. This post has associated therewith, as shown in Figures 11 and 13, a bevel grinding tool 27, and carries a guide member 28 which extends radially from the post at a point diametrically opposite the bevel grinding tool. The guide 28, which is here shown as a rounded button or stud threaded into the shank of the tool post, seats on the circle ground cutting edge of the die and follows the contour thereof as the post is rotated or oscillated to move the grinding tool around the perimeter of the edge 25.

The bevel grinding tool 27 is disposed on an axis that is convergent to the axis of the tool post. As shown in Figures 11 and 13, it is driven by an electric motor 29 mounted in a split clamp sleeve 30 by which it is tightly held. The sleeve and motor are axially movable as a unit in an appropriately formed bore 31 of a head block 32 that is affixed to the upper end of the tool post. The block 32 has a lateral portion 33 bored to engage over a reduced portion 34 at the upper end of the tool post and seat on the shoulder 35 formed by the tool post reduction. A nut 36 threaded on the upper end of the tool post shank serves to clamp the head block portion 33 against the shoulder 35, and the block is further locked to the tool post by set screw means 37.

In the form of apparatus illustrated in Figure 11, axial feed of the bevel grinding tool 27 to its work is accomplished by manually operative means. This means comprises a non-traveling bolt stem 38 rotatively mounted in a lateral lug 39 integral with the head block 32 at the lower end of a guide slot 40 extending longitudinally in the body of the block. The stem 38 has threaded engagement with a traveling nut lug 41 integral with the motor clamp sleeve 30. The lug 41 is disposed in and guided by the slot 40. An operating head 42 on the lower end of the stem 38 provides means by which the stem may be manually rotated to effect axial movement of the motor 29 whereby to feed the tool 27 axially to its work. At a point diametrically opposite the screw feed assembly, the opposed edges of the split clamp sleeve 30 are provided with integral ears 43 which extend with ample clearance laterally into a second longitudinal slot 44 in the head block 32. A bolt 45 in threaded engagement through the ears 43 enables the ears to be drawn together to clamp the sleeve 30 firmly on the motor 29.

Manual oscillation or rotation of the tool post 26 is effected by means of a handle member 46, here shown as a hand wheel, detachably secured on the lower end 26 of the tool post shank which is passed entirely through the roll 16 in the bores of a diametrically registering pair of die blanks. The post 26 is reduced as at 26a immediately adjacent the tool 27 to provide adequate clearance for advancing movement of the tool.

After the die blanks are circle ground as previously described, the roll 16 is mounted in a suitable support (not shown) and the tool post is passed downwardly through a pair of vertically registering die blanks until the guide member 28 seats on the circle ground edge or land 25. The handle 46 is attached to the lower projecting end of the tool post, and the screw feed head 42 is manipulated to bring the bevel grinding tool 27 against the bevel face 24 of the die blank. When the motor 29 is set in operation, the abrasive tool 27 is rotated to grind off metal from the bevel face of the die. During operation of the grinding tool, the post 26 is oscillated or rotated to move the tool around the perimeter of the die. In the course of this movement, the guide 28 follows the contour of the land on which it seats, and the post 26 is thus moved axially to raise and lower the tool correspondingly. It will be apparent that as the tool moves down, it will bite deeper into the bevel face of the die and remove a greater depth of metal than it does as it rises. In this way the bevel is ground off to a uniform depth entirely around the cutting edge so that the edge is of uniform sharpness over its entire extent. Necessary axial feed of the grinding tool as the operation progresses is effected by manipulation of the feed screw 42.

Figures 13 and 14 illustrate an apparatus for effecting automatic operation of the tool post rotating means and the screw feed for the bevel grinding tool. In this embodiment of the invention, a bench 47 is provided with cradle uprights 48 which support the roll 16 with its mounted die blanks 17. An electric motor 49 suitably supported beneath the bench drives a reduction gearing 50 which has a chain and sprocket connection 51 with a crank and pitman assembly 52. The pitman 53 is operatively connected with one end of a rack bar 54 that is mounted for horizontal reciprocation in a guide 55 affixed to the underside of the bench. The lower end of the tool post 26, after it is positioned through the roll and die assembly, extends downwardly through a suitable aperture in the bench into operative engagement with the rack bar 54. At its point of engagement with the rack bar, the post is provided with pinion means 56 in mesh with the rack.

The upper portion of the tool post and the assembly of bevel grinding tool is substantially identical with the structure shown in Figure 11, and the same reference characters are employed to designate the same parts. In this form of the invention, the oscillation of the tool post is automatically effected by the rack bar and pinion connection 54, 56, when the motor 49 is set in operation. At the same time, the bevel grinding tool 27 is driven by its motor 29 and is automatically fed against the die through the medium of a ratchet head 57 on the non-traveling bolt stem 38. As the tool post carrying the motor 29 is oscillated, the ratchet 57 has interval engagement with a pawl 58 mounted on a standard 59 secured to the bench. At each actuating engagement of the pawl and ratchet, the bolt 38 is rotated to advance the motor 29 axially for work engaging feed of the tool 27. A limit switch 60 on the tool post cooperates with a contact 61 carried by the motor 29 to open the motor circuit (not shown) when the tool 27 has reached a predetermined point in its advancing feed.

Although it is preferred that the die roll 16 be employed to hold the die blanks during the operations of circle grinding and bevel grinding, it is contemplated that these operations may be carried out on die blanks mounted in any suitable holder means. Furthermore, the die blanks may, as shown in Figure 15, comprise only segments of a circle. In such cases, the segment 17' to be finished is mounted in its holder 16' and complemented by a dummy blank 62 of any material suitable as a filler to complete the die circle and hold the segment in position. The blank consisting of the assembled segment and filler is then processed by the circle grinding and bevel grinding operations previously described, after which the dummy blank is removed.

I claim:

1. Die edge forming means comprising in combination a support adapted to mount therein, an axially bored die blank having an annular bevel edge in the arc of a circle, a tool post rotatable and axially movable in the die blank bore, a bevel grinding tool supported on said post for movement therewith, means for operating said tool against the bevel of the blank, and guide means on said post in contact with the cutting edge of the blank for shifting said post and grinding tool axially of the die in conformity with the profile of the cutting edge as the tool is moved circumferentially relative to the die.

2. Die edge forming means comprising in combination, a support adapted to mount therein a die having an axial bore, a tool post disposed in said bore for axial and rotary movement therein, said die having a bevel cutting edge of sinuous profile, a follower guide on said post in contact with the tip of said cutting edge for moving the tool post axially in the die bore in conformity with the profile of the cutting edge during rotation of said post relative to the die, a bevel grinding tool carried on the post for movement therewith as a unit, means for operating said tool against the bevel of the die, and means for rotating the tool post relative to the die.

3. Die edge forming means comprising in combination, a support adapted to mount therein a die having an axial bore, a tool post disposed in said bore for axial and rotary movement therein, said die having a cutting edge of sinuous profile, a guide member extending radially from said post in seated engagement on the tip of said cutting edge for moving the tool post axially in the die bore in conformity with the cutting edge profile during rotation of said post relative to the die, a bevel grinding tool supported on said post for movement therewith as a unit, said tool and guide member being diametrically opposed, means for operating said tool against the bevel of the die, and means for imparting rotary movement to the tool post.

4. Die edge grinding apparatus comprising a support, uprights thereon, a rotary die cutter roll positioned horizontally in said uprights and adapted to mount a pair of bevel edge dies radially in service position in said roll at diametrically opposed points, said dies having axial bores communicating through the roll interior, a tool post positioned vertically through the roll and dies and adapted for axial and rotary movement, a bevel grinding tool carried by the upper portion of said post for movement therewith as a unit, screw feed means on the tool post for advancing said tool against the bevel of a die, a fixed standard adjacent the tool post, cooperating pawl and ratchet elements on said standard and screw feed means for automatic operation of the screw feed during oscillation of the tool post, and means on said support in operative engagement with the lower end of said tool post for imparting oscillatory movement thereto.

5. In a die edge grinding apparatus, a tool post adapted for rotary and axial movement, an edge profile follower rigidly secured on said post and extending radially therefrom for bearing contact on the apex of a die edge, said post having a reduced portion opposite said follower, a grinding tool mounted on said post diametrically opposite said follower for bodily movement therewith, the axis of said tool being convergent to that of the post, and means for feeding said tool axially toward the reduced portion of the post.

6. Die edge forming means comprising in combination a support adapted to mount a die blank having a bevel edge portion in the arc of a circle, a tool post associated with said support for rotatable and axial movement relative to the die blank, a bevel grinding tool on said post and bodily movable therewith, means for operating said tool against the bevel of said blank, and guide means on said post bearing on the cutting edge of the blank to shift said post and grinding tool axially of the die blank in conformity with the profile of the cutting edge as the tool is rotated relative to the blank.

JOHN W. HEWITT, Jr.

REFERENCES CITED

The following references are of record in the file of this patent:

UNITED STATES PATENTS

| Number | Name | Date |
|---|---|---|
| 1,591,288 | Davis | July 6, 1924 |
| 1,799,109 | Lyne | Mar. 31, 1931 |
| 1,972,761 | Catching | Sept. 4, 1934 |